(12) United States Patent
Herscovitch et al.

(10) Patent No.: US 9,182,748 B2
(45) Date of Patent: Nov. 10, 2015

(54) RFID ACCESS CONTROL READER WITH ENHANCEMENTS

(71) Applicant: Identive Group, Inc., Santa Ana, CA (US)

(72) Inventors: Matthew Herscovitch, Fremont, CA (US); Jason Hart, Fremont, CA (US); Peter Lowe, Peyton, CO (US)

(73) Assignee: Identive Group, Inc., Santa Ana, CA (US)

( * ) Notice: Subject to any disclaimer, the term of this patent is extended or adjusted under 35 U.S.C. 154(b) by 190 days.

(21) Appl. No.: 13/762,502

(22) Filed: Feb. 8, 2013

(65) Prior Publication Data

US 2013/0214899 A1 Aug. 22, 2013

Related U.S. Application Data

(60) Provisional application No. 61/596,529, filed on Feb. 8, 2012.

(51) Int. Cl.

| G05B 1/01 | (2006.01) |
|---|---|
| H04Q 3/00 | (2006.01) |
| H04Q 5/22 | (2006.01) |
| H04L 9/00 | (2006.01) |
| G05B 19/00 | (2006.01) |
| G07F 7/08 | (2006.01) |
| G07F 7/10 | (2006.01) |
| G07F 7/12 | (2006.01) |
| G07C 9/00 | (2006.01) |

(52) U.S. Cl.
CPC .............. *G05B 1/01* (2013.01); *G07C 9/00111* (2013.01); *G07F 7/0873* (2013.01); *G07F 7/10* (2013.01); *G07F 7/122* (2013.01)

(58) Field of Classification Search
CPC ........................................................ G05B 1/01

USPC ............... 340/10.1–10.5, 5.53, 5.6, 5.52; 712/176, 168, 171; 235/375, 385; 370/352, 465

See application file for complete search history.

(56) References Cited

U.S. PATENT DOCUMENTS

| 7,117,364 | B1 * | 10/2006 | Hepper et al. ................ 713/176 |
|---|---|---|---|
| 7,898,419 | B2 * | 3/2011 | Cristache .................. 340/572.1 |
| 8,294,552 | B2 * | 10/2012 | Beenau et al. ............... 340/5.83 |
| 8,698,603 | B2 * | 4/2014 | Jett et al. ...................... 340/10.4 |
| 2004/0028042 | A1 * | 2/2004 | Srinivasan ............. G11B 27/28 370/392 |
| 2004/0067774 | A1 * | 4/2004 | Masaoka ............. H04W 76/028 455/561 |
| 2006/0136717 | A1 * | 6/2006 | Buer et al. ..................... 713/155 |
| 2008/0042830 | A1 | 2/2008 | Chakraborty et al. |
| 2008/0129509 | A1 * | 6/2008 | Duron .................. H01Q 1/2216 340/572.4 |
| 2009/0095812 | A1 * | 4/2009 | Brown et al. ................. 235/380 |
| 2010/0127834 | A1 * | 5/2010 | Cobianu ............ G06K 19/0672 340/10.1 |

(Continued)

*Primary Examiner* — Nam V Nguyen
(74) *Attorney, Agent, or Firm* — Proskauer Rose LLP

(57) ABSTRACT

Systems are described herein for providing card reader configuration and access control, including a card reader, a remote computing device, and a communications network coupled to the card reader and the remote computing device. The card reader is configured to connect to the remote computing device via the communications network, transmit a request to the remote computing device via the communications network, receive data from the remote computing device via the communications network, and configure operational settings based on the received data. The remote computing device is configured to receive the request from the card reader via the communications network, generate data responsive to the request, and transmit the data to the card reader via the communications network.

29 Claims, 10 Drawing Sheets

(56) References Cited

U.S. PATENT DOCUMENTS

| | | |
|---|---|---|
| 2011/0302264 A1 | 12/2011 | Lawrence et al. |
| 2012/0001730 A1 | 1/2012 | Potyrailo et al. |
| 2012/0218084 A1* | 8/2012 | Arponen et al. ............ 340/10.5 |
| 2012/0258777 A1 | 10/2012 | Huang |

* cited by examiner

US 9,182,748 B2

RFID ACCESS CONTROL READER WITH ENHANCEMENTS

RELATED APPLICATIONS

This application claims priority to U.S. Provisional Patent Application No. 61/596,529, filed Feb. 8, 2012.

FIELD OF THE INVENTION

The subject matter of this application relates generally to proximity card readers that provide access control to systems or buildings, enhanced with additional communications and security features.

BACKGROUND

Traditionally, card readers are associated with an access point to a system or building. In a physical access control system, card readers are commonly located at a door and each person who is authorized to enter the premises carries an access card that interacts with the readers. The access card can contain a semiconductor chip containing an EEPROM memory or a similar device (e.g., a radio-frequency identification (RFID) chip or an application-specific integrated circuit (ASIC) chip) that is programmed with a code number. The code number can be a single value or stored in multiple fields that correspond to, e.g., a serial number and a facility code to designate a building or series of buildings. Generally, the card is programmed by the card manufacturer before delivery to the systems integrator or user. The chip within the card is connected to an antenna, and the card transmits the number to the card reader through use of an electromagnetic induction signal.

The reader is typically no more than a pass-through device, where the reader routes messages to the control panel without addition or modification. The reader typically sends out an interrogating signal at 125 KHz to 134 KHz, known as Low Frequency (LF). Other frequencies are also used; for example, another frequency band known as HF operates at the singular frequency of 13.56 Mhz. The card is presented to the reader (e.g., by being placed in proximity to the reader), and the reader reads a message from the card. The reader is programmed to strip the message of its overhead structure, and reformat the message in a standardized data stream which the reader sends to a control panel. For example, the standardized format can be the so-called Wiegand code. The control panel may or may not recognize the card as belonging to the population of authorized entrants. If the card is recognized as authorized, the panel takes appropriate action to open the door which generally involves setting a relay that sends an electric current to activate a device at the door (e.g., a magnetic strike or lock).

FIG. 1 is a block diagram of a system 100 comprising a card access control reader 103 connected to a control panel 101, as illustrated in the art. The reader 103 is connected to the control panel 101 via connection 102 (e.g., Wiegand interface). A card 104 is presented to the reader 103 (e.g., by passing the card in close proximity to the reader, or touching the card to the reader) using an RFID signal 105, and the reader 103 receives a message from the card 104.

SUMMARY OF THE INVENTION

What is needed are card access control readers with additional enhancements that augment the capabilities of existing card readers to provide improved security, convenience, and communications features.

The invention, in one aspect, features a computerized system for providing card reader configuration and access control. The system includes a card reader, a remote computing device, and a communications network coupled to the card reader and the remote computing device. The card reader is configured to connect to the remote computing device via the communications network, transmit a request to the remote computing device via the communications network, receive data from the remote computing device via the communications network, and configure operational settings based on the received data. The remote computing device is configured to receive the request from the card reader via the communications network, generate data responsive to the request, and transmit the data to the card reader via the communications network.

In some embodiments, any of the above aspects can include one or more of the following features. In some embodiments, the system includes a control panel coupled to the card reader via a Wiegand interface. In some embodiments, the system includes a control panel coupled to the card reader via a serial, parallel, or networked communications interface.

In some embodiments, the system includes a database coupled to the remote computing device, where the database contains information for use by the remote computing device in generating the data. In some embodiments, the information includes active card numbers and inactive card numbers. In some embodiments, the card reader stores the active card numbers and inactive card numbers in a memory module coupled to the card reader. In some embodiments, the information includes configuration instructions. In some embodiments, the remote computing device is configured to transmit data to the card reader without first receiving a request from the card reader.

In some embodiments, the system includes a wireless communication module coupled to the card reader, where the wireless communication module enables the card reader to communicate with the communications network and the remote computing device wirelessly. In some embodiments, the system includes a secure authentication module (SAM) coupled to the card reader, where the SAM is configured to store one or more keys used to authenticate the card reader to the remote computing device and encrypt the connection between the card reader and the remote computing device via the communications network. In some embodiments, the physical form of the SAM is a subscriber identity module (SIM) card. In some embodiments, the physical form of the SAM is a smart card. In some embodiments, the SAM is connected to the card reader via a physical interface. In some embodiments, the SAM is embedded within the card reader. In some embodiments, the card reader encrypts messages transmitted to the remote computing device using the keys stored in the SAM.

In some embodiments, the remote computing device is a virtual server existing on a shared web service. In some embodiments, the card reader includes an integrated video camera. In some embodiments, the video camera is configured to detect motion. In some embodiments, the video camera is configured for facial recognition.

In some embodiments, the card reader includes an integrated microphone. In some embodiments, the integrated microphone is configured to enable voice communication with a remote location. In some embodiments, the integrated microphone is configured to receive voice commands from a user.

In some embodiments, the card reader includes an integrated alphanumeric display panel. In some embodiments, the alphanumeric display panel is configured to display messages received from the remote computing device. In some embodiments, the alphanumeric display panel is configured to display messages stored locally on the card reader.

In some embodiments, the card reader includes an integrated loudspeaker. In some embodiments, the integrated loudspeaker is configured to enable voice communication between a user at the card reader and a remote user.

In some embodiments, the card reader includes an integrated biometric sensor. In some embodiments, the integrated biometric sensor is configured to enable identification of a user. In some embodiments, the integrated biometric sensor includes at least one of: a fingerprint scanner, an iris scanner, a palm geometry scanner, and a retina scanner. In some embodiments, the card reader is configured to read a plurality of cards having different message formats.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
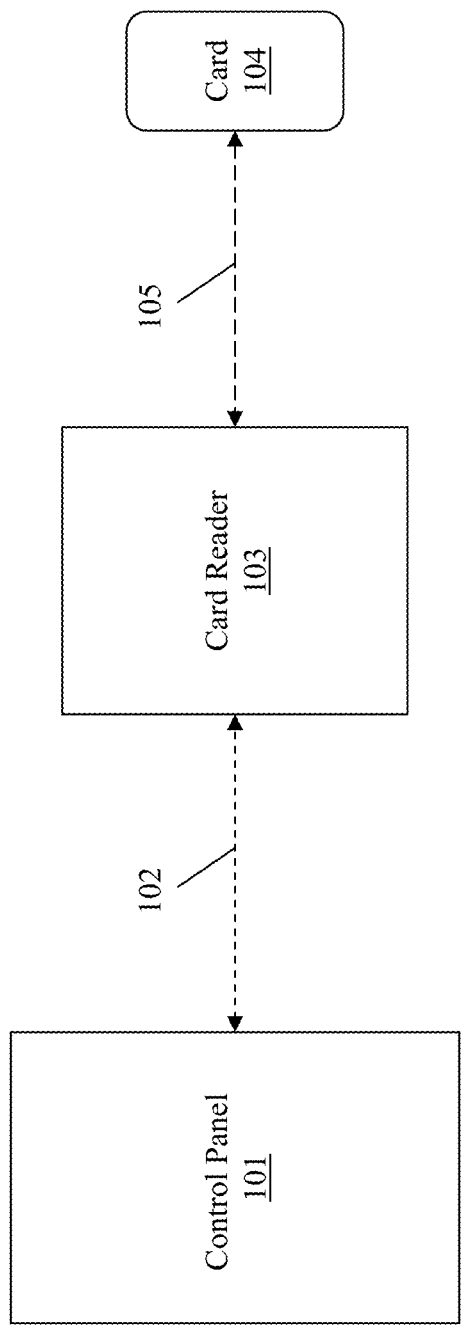
FIG. 1 is a block diagram of a conventional card access control reader, as illustrated in the art.
Figure 2:
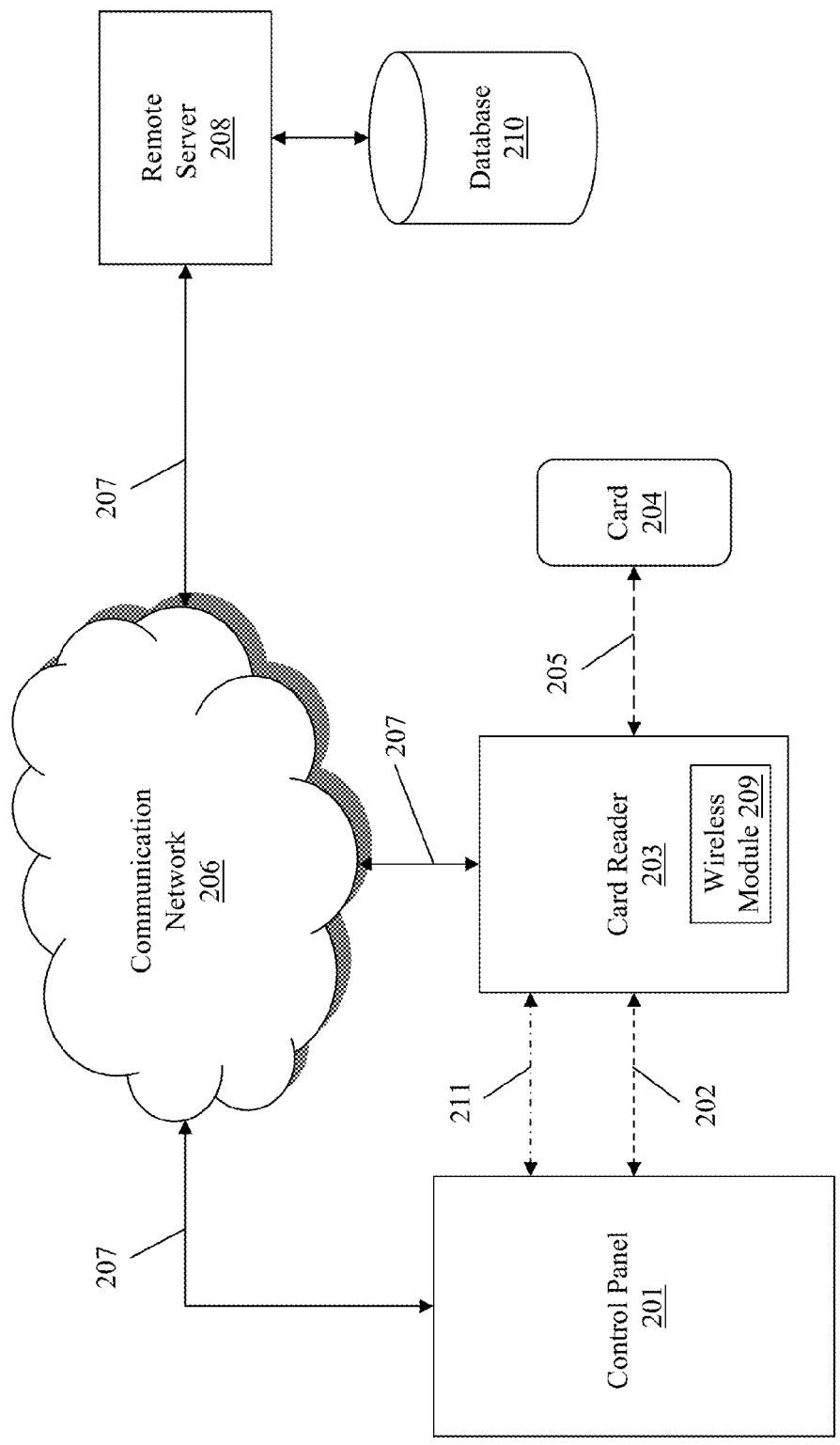
FIG. 2 is a block diagram of an access control system with a card access control reader having a wireless module to enable connection through a network to a remote server.

FIG. 2 is a block diagram of an access control system 200 with a card access control reader 203 having a wireless module 209 to enable connection through a network 206 to a remote server 208. The system 200 in FIG. 2 includes a control panel 201 connected to a card reader 203 via a connection 202 (e.g., Wiegand interface). The system 200 also includes a card 204 (e.g., smart card) that is presented to the reader 203 using an RFID signal 205, and the reader 203 receives a message from the card 204.

The system 200 further includes an external communications network (e.g., network 206) through which the card reader 203 is connected (207) to a remote computing device (e.g., remote server 208). The card reader 203 includes a wireless module 209 (e.g., WiFi) that allows the card reader to communicate wirelessly via the network 206 to the remote server 208. The server 208 is programmed to respond to messages received from the reader 203 through the network connection 207. The messages sent by the reader 203 include requests for service and/or maintenance. The server 208 includes or is coupled to a database 210 that contains configurations of the readers (e.g., reader 203) installed on the network and other data associated with operation of the reader 203. The server 208 can be connected to other card readers (not shown in FIG. 2) using the same network 206 or a separate communications network. In some embodiments, the system includes a control panel 201 coupled to the card reader 203 via a high speed communication interface 211. The high speed communication interface 211 is used to provide a secure channel between the card reader 203 and the remote computing device 208 through the control panel 201 via external communications link 207.

In some embodiments, the communications network 206 is a cloud-based network. In some embodiments, the server 208 is a shared resource type, such as Amazon Elastic Compute Cloud EC2 offered by Amazon Web Services LLC. The reader 203 can pull data from the remote server 208 via the network 206, meaning that the reader 203 controls implementation of changes or updates to information that may be required. The remote server 208 can push data to the reader 203 via the network 206, meaning that the server 208 controls implementation of changes or updates to information that may be required. For example, changes that can be effected by remote server control include, but are not limited to, modifications to the formats that the reader 203 may accept, or to global messages such as a Card Revocation Lists (CRL). It should be appreciated that numerous other messages are possible within the scope of the techniques described herein.

Figure 3:
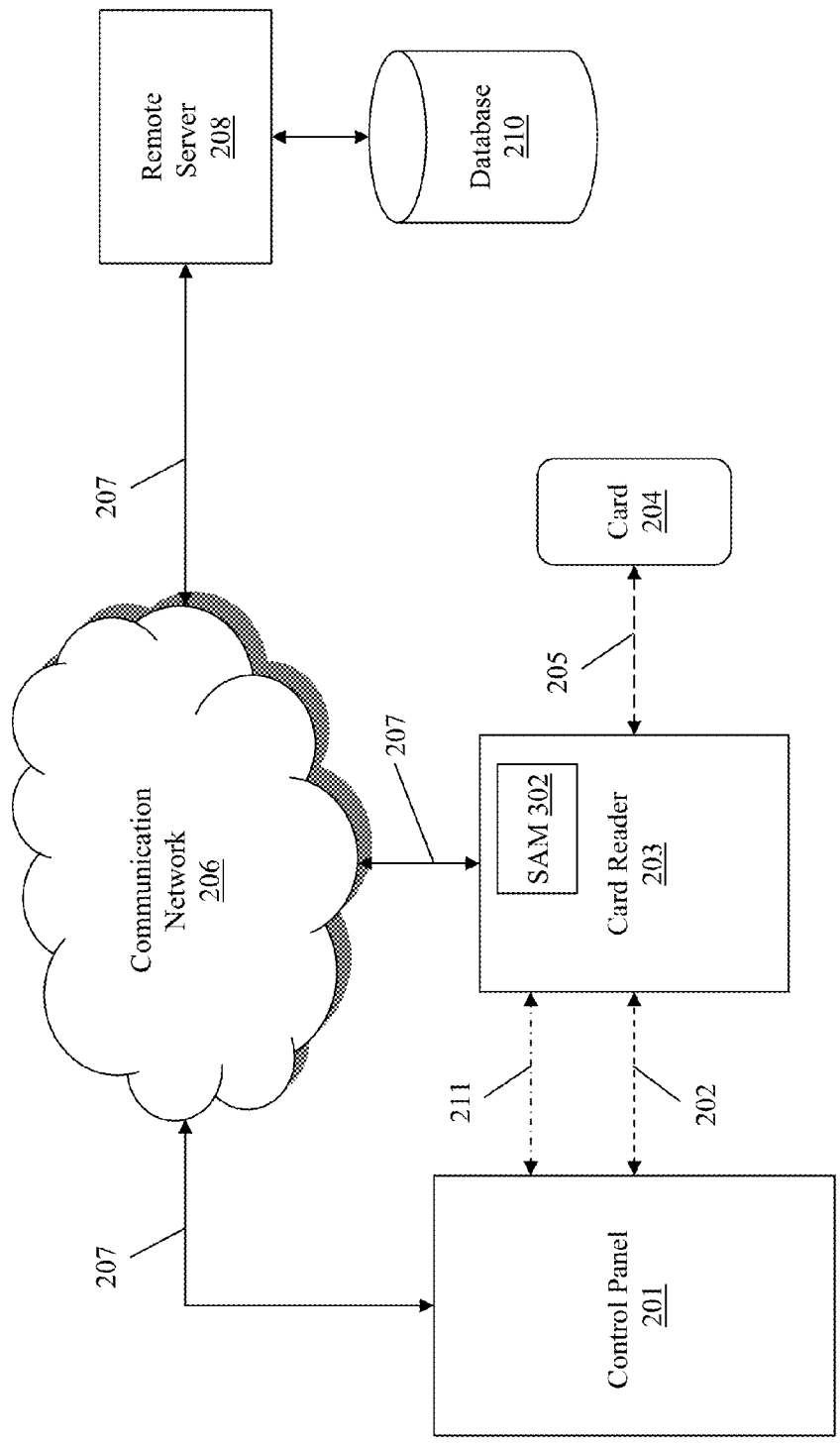
FIG. 3 is a block diagram of an access control system with a card access control reader connected to a network and remote server using a Security Authentication Module (SAM).

FIG. 3 is a block diagram of an access control system 300 with a card access control reader 203 connected to a network 206 and remote server 208 using a Security Authentication Module (SAM) 302. The SAM 302 contains keys necessary to match keys located at the remote server 208 in order to provide a secure link. The physical form of the SAM 302 can be similar to a subscriber identity module (SIM) card in a cell phone or a conventional contact smart card. In either case, the SAM 302 plugs into a slot or interface in the reader 203. In some embodiments, the SAM 302 can be permanently built into the reader 203. The SAM 302 enables secure communications from the card reader 203 to the remote server 208 via the network 206 such as in a public key infrastructure (PKI) protocol. The inclusion of SAM 302 is advantageous, for example, when the server 208 is transmitting card numbers to the reader 203 because without a secure connection, a card or a system could be compromised.

Figure 4:
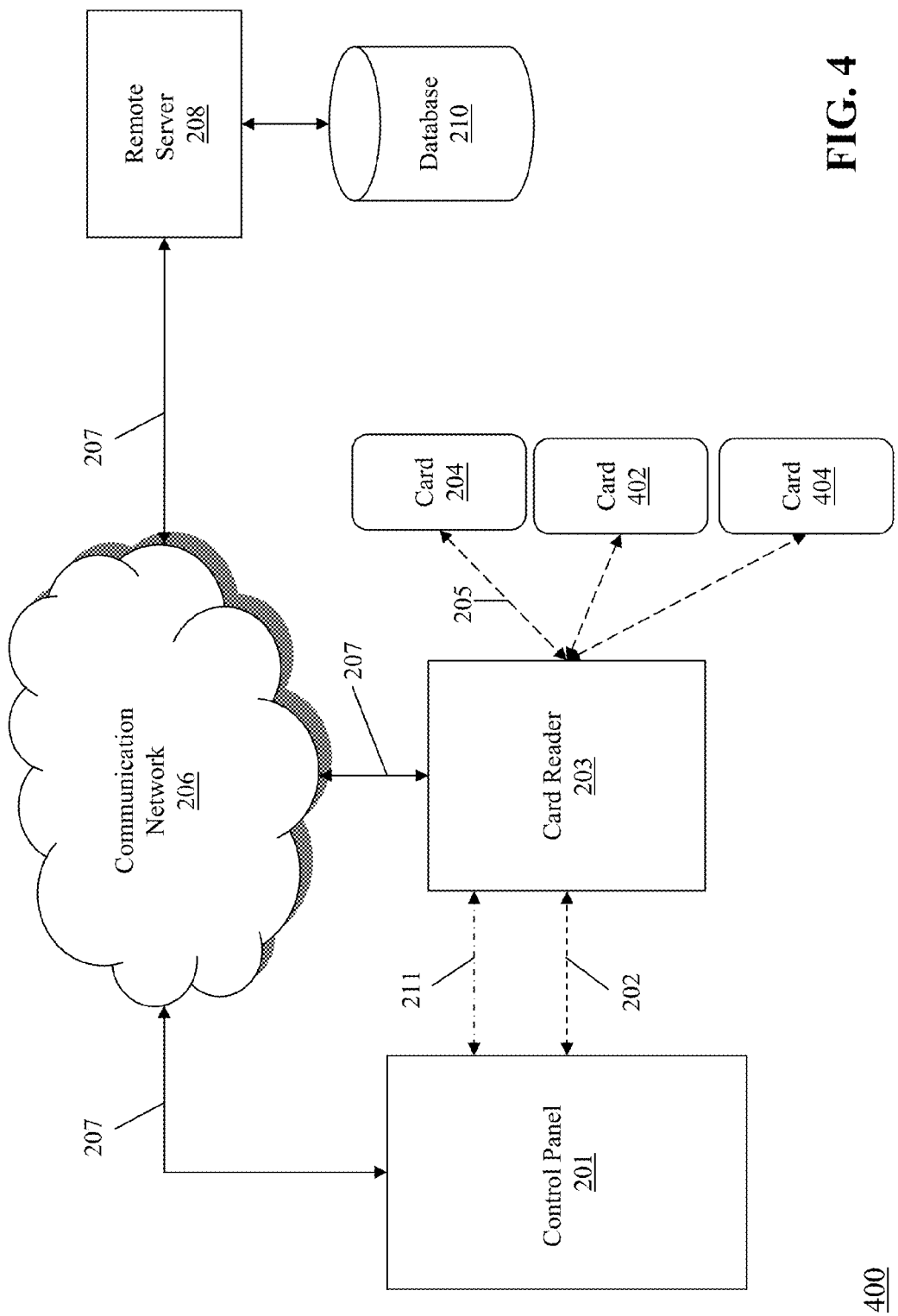
FIG. 4 is a block diagram of an access control system with a card access control reader configured to read cards having a number of different formats.

FIG. 4 is a block diagram of an access control system 400 with a card access control reader 203 configured to read cards (e.g., cards 204, 402, 404) having a number of different formats. Each of the cards 204, 402, 404 shown in FIG. 4 is formatted differently according to a specific protocol. For each card, the card reader 203 is able to read the card and determine whether to allow access. An advantage of the system 400 depicted in FIG. 4 is that, by reading a number of different card types, the reader 203 can be used in a system where old cards and card readers are required to co-exist with new cards and readers. The reader 203 can, for example, read a certain proprietary card format by adjusting its frequency and input filters, and wait for a period of time looking for cards of a particular combination of frequency, message length and modulation method. After a predetermined time, the reader 203 can adjust to another different card format and scan for cards of that type. For cards of different frequency, the reader 203 can listen for cards of different formats simultaneously. The remote server 208 can control the card formats to which the reader 203 is responsive by, for example, transmitting data for reading different formats to the reader 203. Additional detail regarding cards and card readers capable of accommodating multiple message formats is found in U.S. patent application Ser. No. 13/747,157, filed Jan. 22, 2013 and titled "Proximity Devices and Systems that Support Multiple Formats," which is incorporated herein in its entirety.

Figure 5:
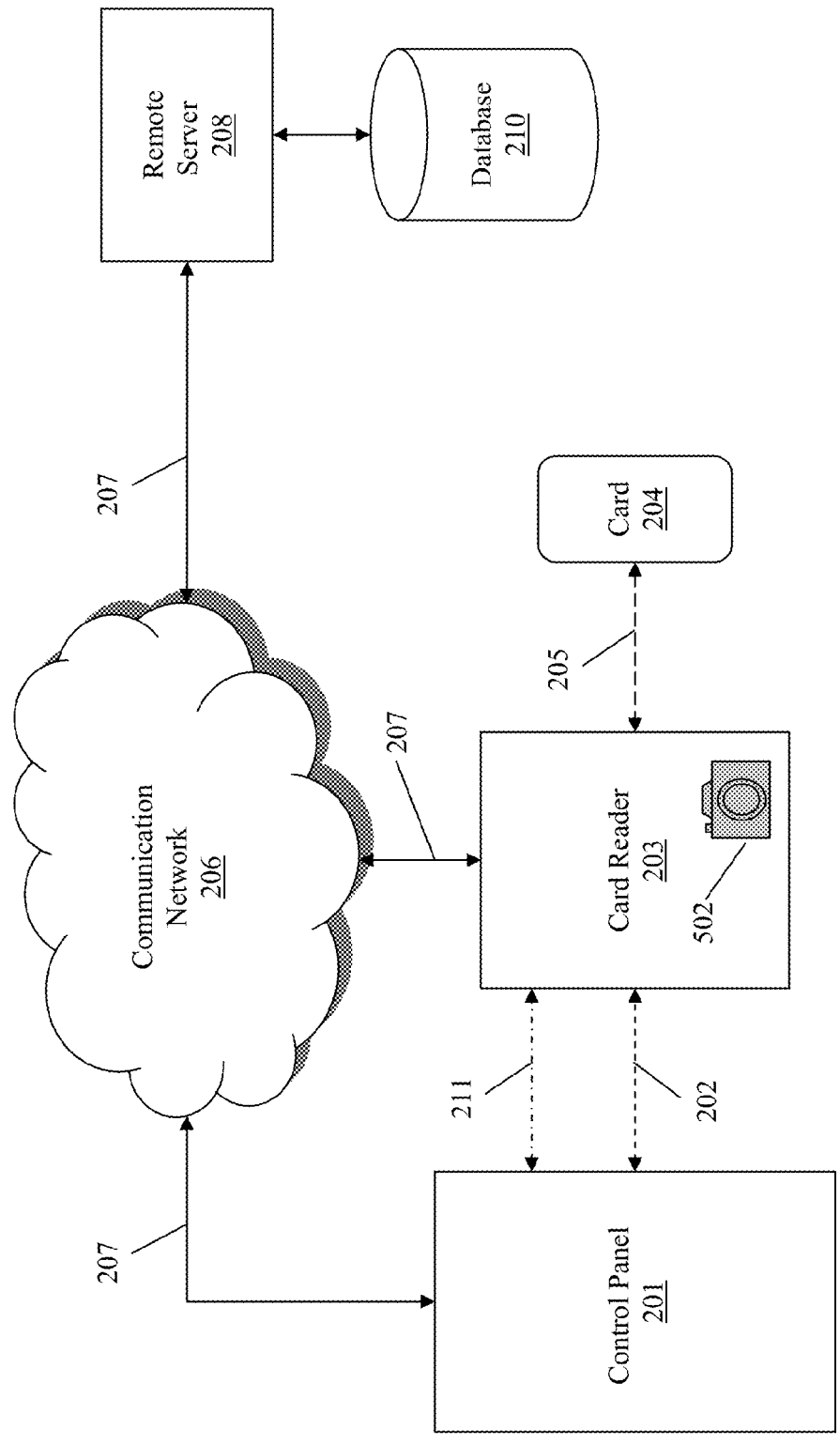
FIG. 5 is a block diagram of an access control system with a card access control reader having an integrated camera.

FIG. 5 is a block diagram of an access control system 500 with a card access control reader 203 having an integrated camera 502. The camera 502 is mounted in the reader 203 and adjusted to view the person presenting the card 204. In one embodiment, the camera 502 captures images and/or movement in an area in front of the reader 203 and does not attempt to analyze the captured images (e.g., motion sensing). The captured images can be used, for example, to turn on the reader 203 or other local functions. In another embodiment, the reader 203 transmits captured camera images to the remote server 208, and the server 208 can perform a facial recognition algorithm on the images to compare a person in the images to a stored database of faces to enhance the level of security in the system by rejecting unknown persons or known but unwelcome persons.

Figure 6:
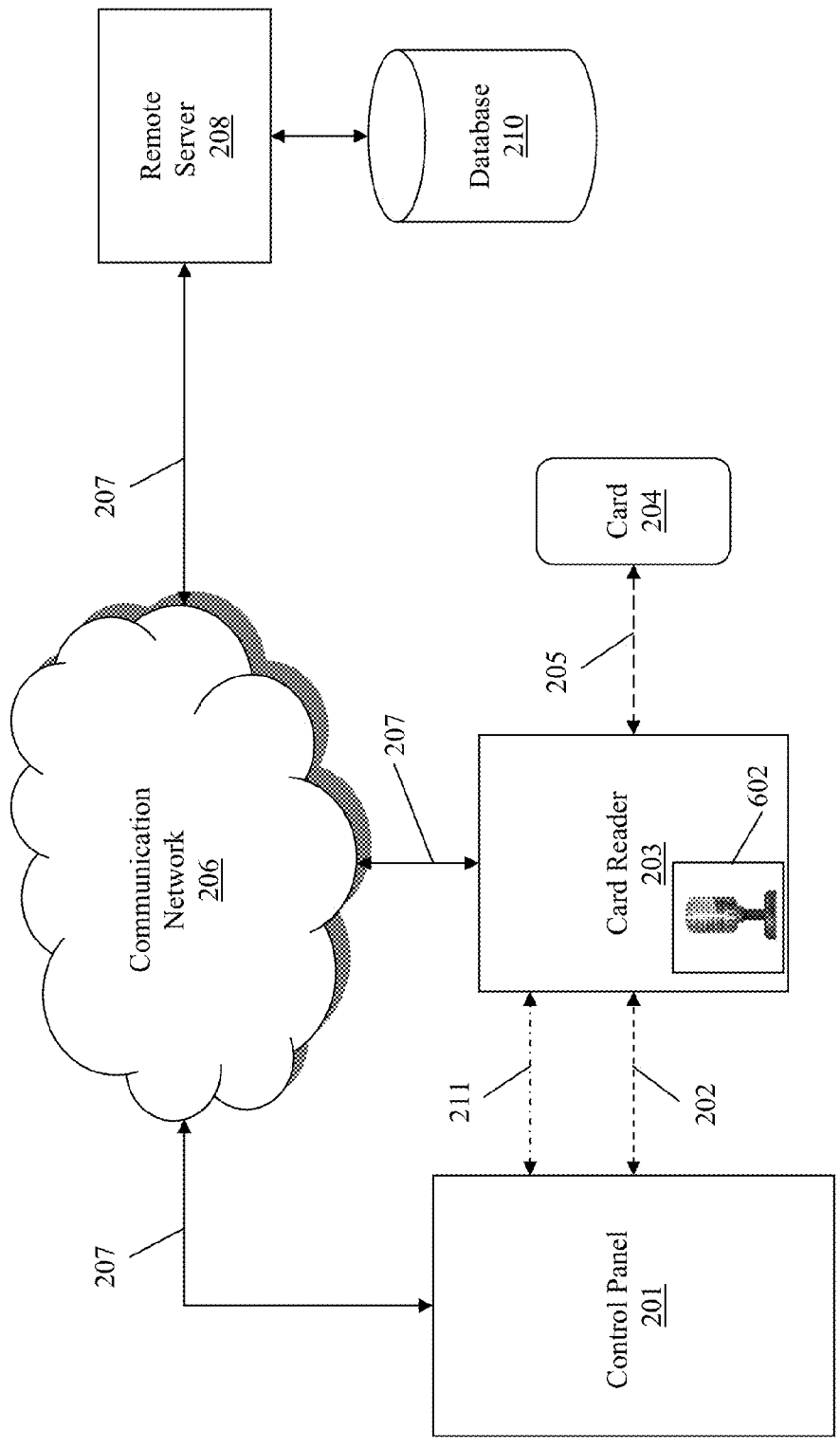
FIG. 6 is a block diagram of an access control system with a card access control reader having an integrated microphone.

FIG. 6 is a block diagram of an access control system 600 with a card access control reader 203 having an integrated microphone 602. The microphone 602 is added to the reader 203, in addition to other audio devices (e.g., a sounder) that RFID readers can have. The reader 203 uses the microphone to capture audio (e.g., voice messages) and transmit the captured audio to the remote server 208. The server 208 can create a communications session and/or link between the reader 203 and other devices (e.g., a terminal located at a security office) so that the person at the reader 203 is able to communicate with a person at the security office. In some examples, the reader 203 can execute speech recognition software such that, for example, the reader 203 can respond to speech messages (e.g., "open," "close," or "emergency"). In some examples, the reader 203 can include voice recognition software (e.g., software that analyzes the audio characteristics of a person's voice to identify that person) which enables the reader 203 to recognize a person authorized to enter, in addition or instead of using the code on the card 204. In some embodiments, the reader 203 transmits the captured audio to the remote server 208, and the remote server 208 performs the speech recognition and/or voice recognition functions.

Figure 7:
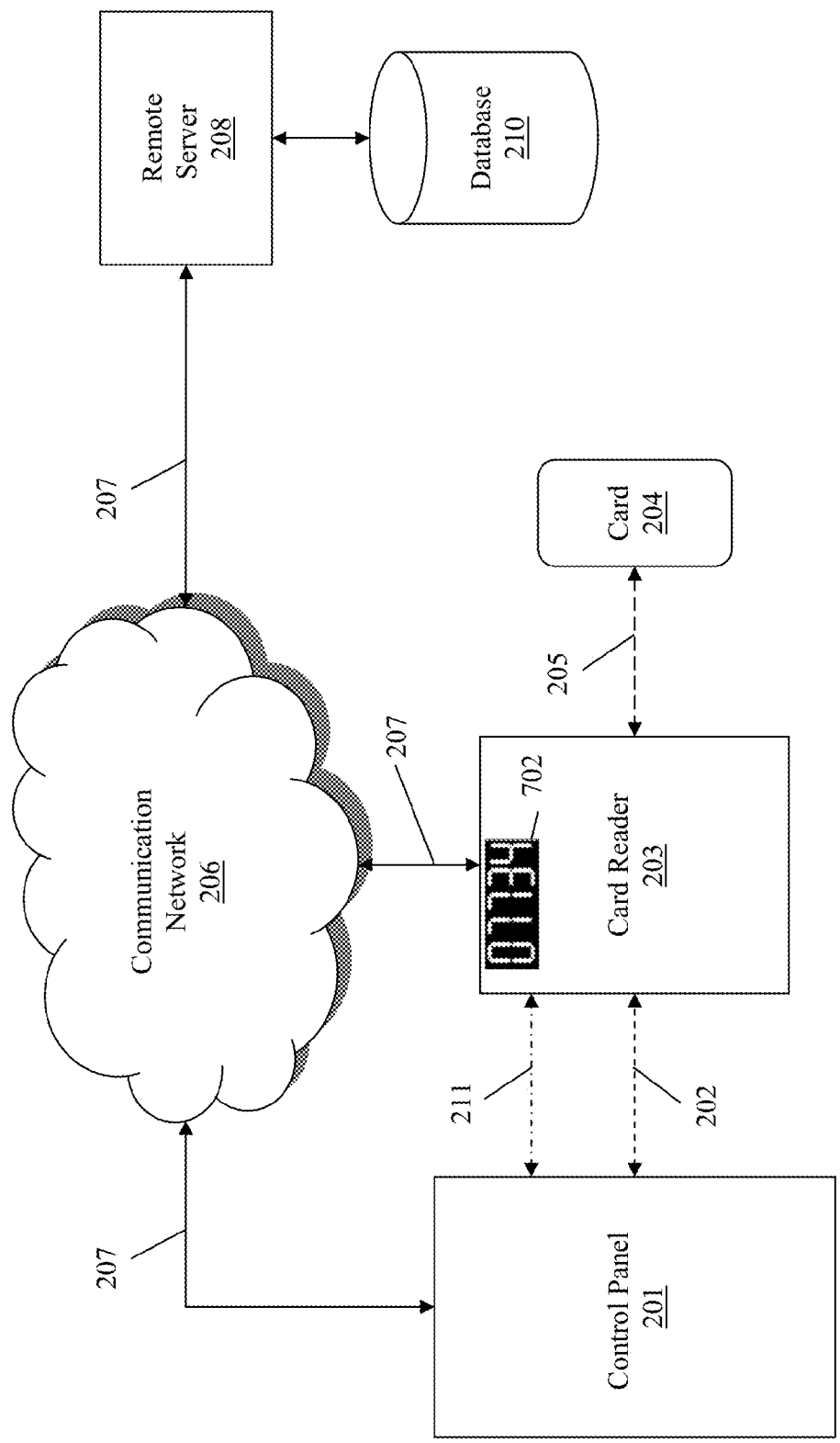
FIG. 7 is a block diagram of an access control system with a card access control reader having an integrated alphanumeric display panel.

FIG. 7 is a block diagram of an access control system 700 with a card access control reader 203 having an integrated alphanumeric display panel 702. The display panel can be used to present messages or other information to a user at the card reader 203. For example, the remote server 208 can transmit messages to the card reader 203 for display on the panel 702. The messages can be of a broadcast type such as "Don't forget Monday is a holiday," or can be of a local type using pre-stored messages like "Card Not Recognized." In some embodiments, the remote server 208 can transmit a message for display on the panel 702 based on the identity of a user of the card 204 that is attempting to gain access (e.g., "Good morning, Dave").

Figure 8:
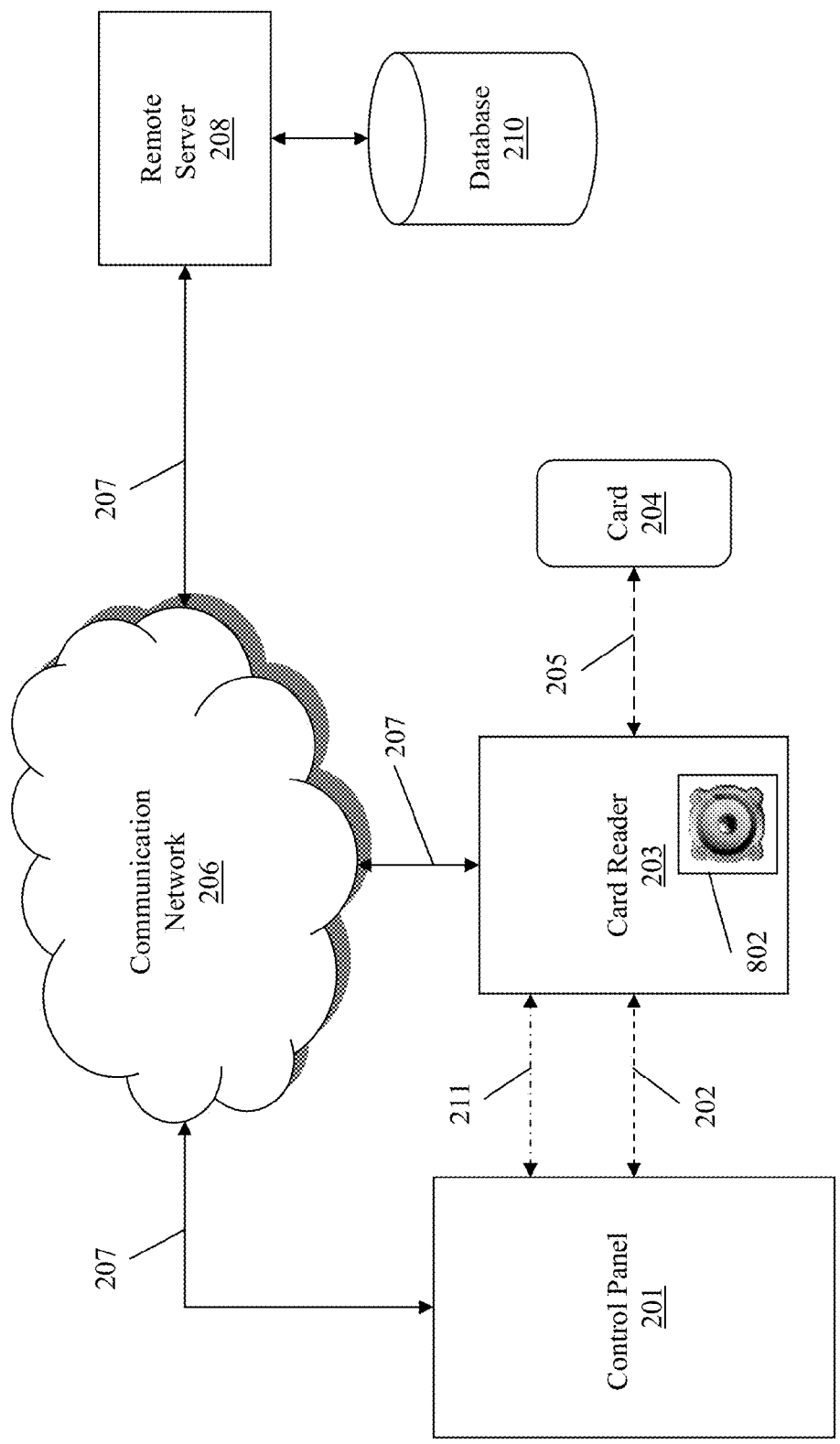
FIG. 8 is a block diagram of a card access control reader with an integrated speaker.

FIG. 8 is a block diagram of an access control system 800 with a card access control reader 203 having a loudspeaker 802. The loudspeaker 802 can play back digital audio messages received from the remote server 208. For example, the messages can be live speech, e.g., from a guard asking for a password or for the identity of a person seeking entrance. In another example, the messages can be prerecorded messages (either stored locally on the card reader 203 or transmitted from the server 208) such as "Card Not Recognized."

Figure 9:
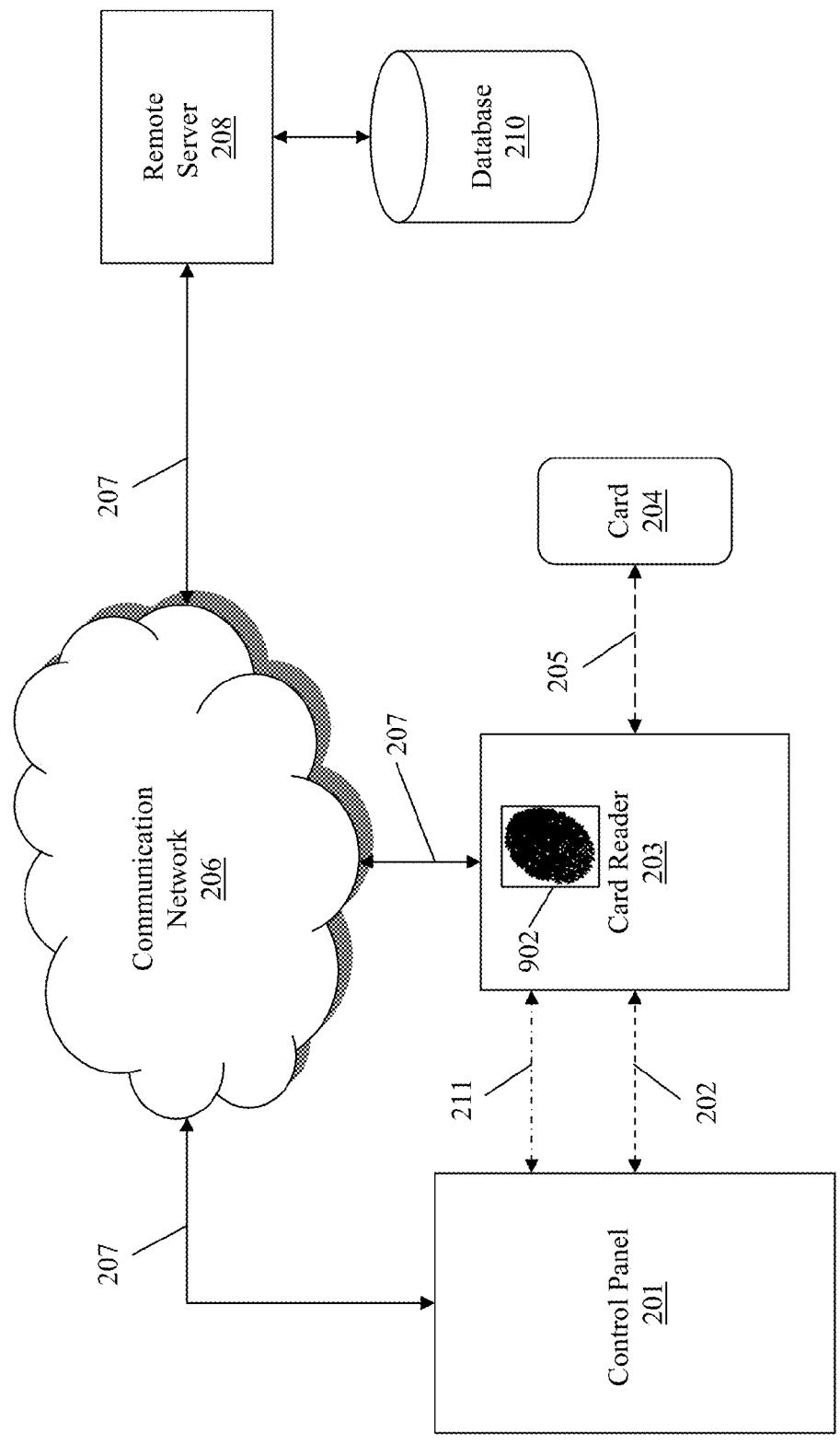
FIG. 9 is a block diagram of an access control system with a card access control reader having an integrated biometric sensor.

FIG. 9 is a block diagram of an access control system 900 with a card access control reader 203 having an integrated biometric sensor 902. The biometric sensor 902 captures a unique physical attribute of the person desiring entrance. In some embodiments, the captured attribute is transmitted to the remote server 208 for evaluation and authentication. In some embodiments, the captured attributed is evaluated locally by the card reader 203, where the card reader 203 stores a set of reference attributes for each individual (e.g., a one-time enrollment process) or calls down the set of reference attributes from the remote server 208 periodically. Although FIG. 9 represents the biometric sensor 902 as a fingerprint scanner, it should be understood that the biometric sensor 902 can take any of a number of forms (e.g., iris scanner, palm geometry scanner, vein print scanner, or retina scanner) without departing from the scope of the invention.

Figure 10:
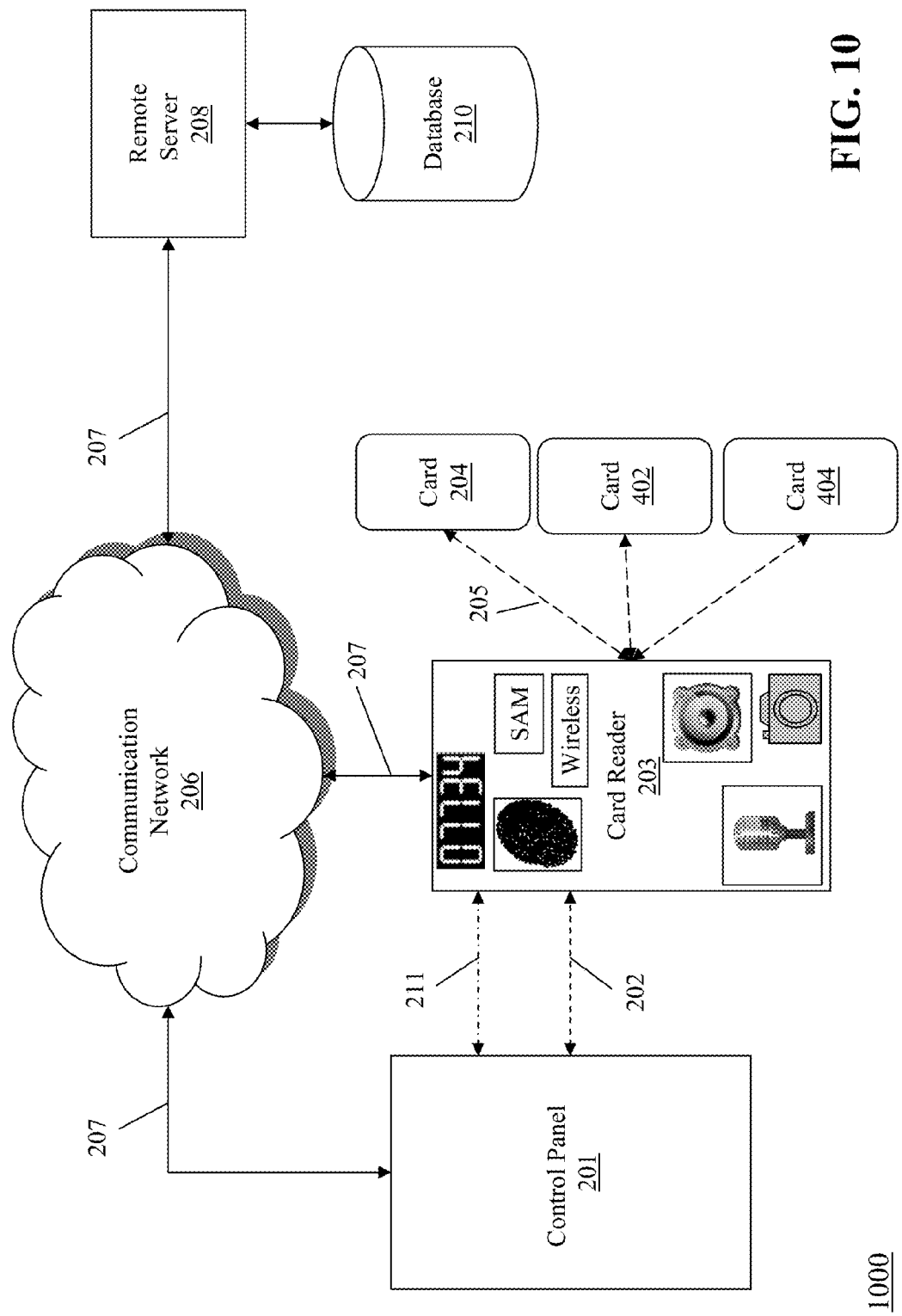
FIG. 10 is a block diagram of an access control system with a card access control reader having each of the additional modules and integrated devices in FIGS. 2-9.

It should be appreciated that any of the integrated modules and devices described above in FIGS. 2-9 can be combined in a card access control reader to augment the default capabilities of the card reader. FIG. 10 is a block diagram of an access control system 1000 with a card access control reader 203 having each of the additional modules and integrated devices described in FIGS. 2-9.

It should also be appreciated that although a card-type access credential is described herein, it should be obvious to those skilled in the art that the credential can take other forms, such as a key fob, button, or token.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A computerized system for providing card reader configuration and access control, the system comprising:
 a card reader;
 a remote computing device; and
 a communications network coupled to the card reader and the remote computing device;
 wherein the card reader is configured to:
  connect to the remote computing device via the communications network;
  transmit a request to the remote computing device via the communications network;
  receive data from the remote computing device via the communications network, the data comprising instructions for reading a plurality of card formats in a sequential, time-based manner, each card format based upon a particular combination of frequency, message length, and modulation method; and
  configure operational settings based on the received data, wherein the configuration includes making prescribed adjustments to frequency and input filters of the card reader and setting a time duration during which the frequency and input filters are set to particular values before changing;
 wherein the remote computing device is configured to:
  receive the request from the card reader via the communications network;

generate data responsive to the request, wherein the data includes the instructions for reading a plurality of card formats in a sequential, time-based manner; and transmit the data to the card reader via the communications network.

2. The system of claim 1, further comprising a control panel coupled to the card reader via a Wiegand interface.

3. The system of claim 1, further comprising a control panel coupled to the card reader via a serial, parallel, or networked communications interface.

4. The system of claim 1, further comprising a database coupled to the remote computing device, wherein the database contains information for use by the remote computing device in generating the data.

5. The system of claim 4, wherein the information includes active card numbers and inactive card numbers.

6. The system of claim 5, wherein the card reader stores the active card numbers and inactive card numbers in a memory module coupled to the card reader.

7. The system of claim 1, wherein the remote computing device is configured to transmit data to the card reader without first receiving a request from the card reader.

8. The system of claim 1, further comprising a wireless communication module coupled to the card reader, wherein the wireless communication module enables the card reader to communicate with the communications network and the remote computing device wirelessly.

9. The system of claim 1, further comprising a secure authentication module (SAM) coupled to the card reader, wherein the SAM is configured to store one or more keys used to authenticate the card reader to the remote computing device and encrypt the connection between the card reader and the remote computing device via the communications network.

10. The system of claim 9, wherein the physical form of the SAM is a subscriber identity module (SIM) card.

11. The system of claim 9, wherein the physical form of the SAM is a smart card.

12. The system of claim 9, wherein the SAM is connected to the card reader via a physical interface.

13. The system of claim 9, wherein the SAM is embedded within the card reader.

14. The system of claim 9, wherein the card reader encrypts messages transmitted to the remote computing device using the keys stored in the SAM.

15. The system of claim 1, wherein the remote computing device is a virtual server existing on a shared web service.

16. The system of claim 1, wherein the card reader includes an integrated video camera.

17. The system of claim 16, wherein the video camera is configured to detect motion.

18. The system of claim 16, wherein the video camera is configured for facial recognition.

19. The system of claim 1, wherein the card reader includes an integrated microphone.

20. The system of claim 19, wherein the integrated microphone is configured to enable voice communication with a remote location.

21. The system of claim 19, wherein the integrated microphone is configured to receive voice commands from a user.

22. The system of claim 1, wherein the card reader includes an integrated alphanumeric display panel.

23. The system of claim 22, wherein the alphanumeric display panel is configured to display messages received from the remote computing device.

24. The system of claim 22, wherein the alphanumeric display panel is configured to display messages stored locally on the card reader.

25. The system of claim 1, wherein the card reader includes an integrated loudspeaker.

26. The system of claim 25, wherein the integrated loudspeaker is configured to enable voice communication between a user at the card reader and a remote user.

27. The system of claim 1, wherein the card reader includes an integrated biometric sensor.

28. The system of claim 27, wherein the integrated biometric sensor is configured to enable identification of a user.

29. The system of claim 27, wherein the integrated biometric sensor includes at least one of: a fingerprint scanner, an iris scanner, a palm geometry scanner, and a retina scanner.

* * * * *